United States Patent [19]

Bendall

[11] 4,227,425
[45] Oct. 14, 1980

[54] SINGLE ROCKER JOINT DRIVE CHAIN

[76] Inventor: Wilfrid H. Bendall, Saybrook Rd., Essex, Conn. 06426

[21] Appl. No.: 26,830

[22] Filed: Apr. 4, 1979

[51] Int. Cl.³ ............................................. F16G 13/02
[52] U.S. Cl. .................................... 474/213; 403/161; 474/223
[58] Field of Search ........... 74/245 LP, 253 R, 245 S, 74/251 R, 250 S, 251 S, 253 S, 254; 403/161

[56] References Cited

U.S. PATENT DOCUMENTS

| | | | |
|---|---|---|---|
| 1,678,457 | 7/1928 | Belcher | 74/253 S |
| 2,047,833 | 7/1936 | Pierce | 74/253 S |
| 3,066,549 | 12/1962 | Benjamin | 74/254 |
| 3,099,346 | 7/1963 | Maas | 74/254 |
| 4,005,609 | 2/1977 | Bendall | 74/230.17 S |

*Primary Examiner*—Kenneth Dorner

[57] ABSTRACT

An inverted tooth type chain has groups of toothed links interconnected by a round rocker joint pin member extending through substantially round apertures at overlapping ends of the links. The apertures are larger in diameter than the pins to provide clearance for the rocking joint action of the links on the pins comprise a self-centering joint. The pins are manually removable without tools and have link assembly retention means at each end.

6 Claims, 4 Drawing Figures

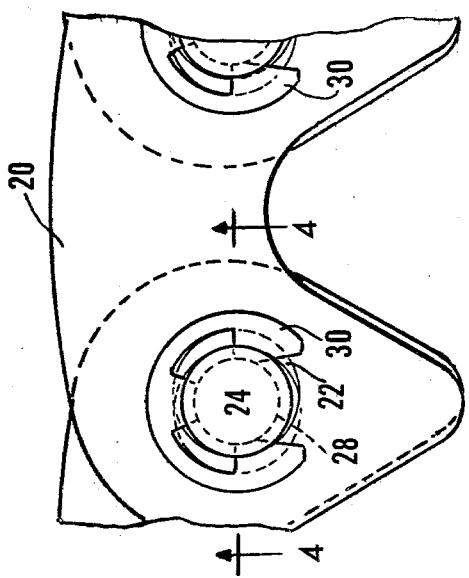
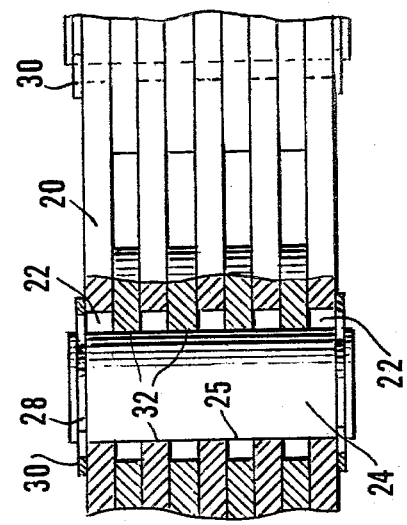
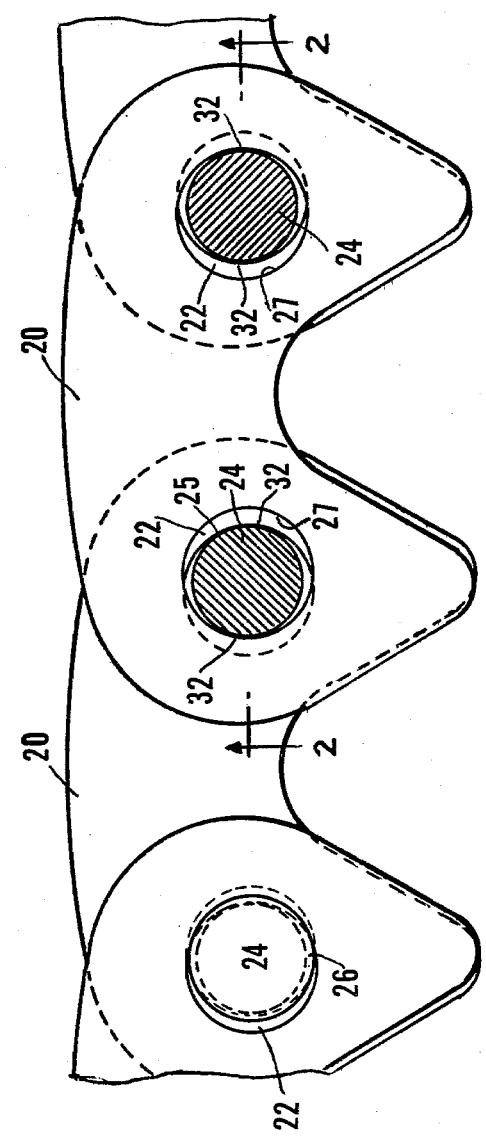
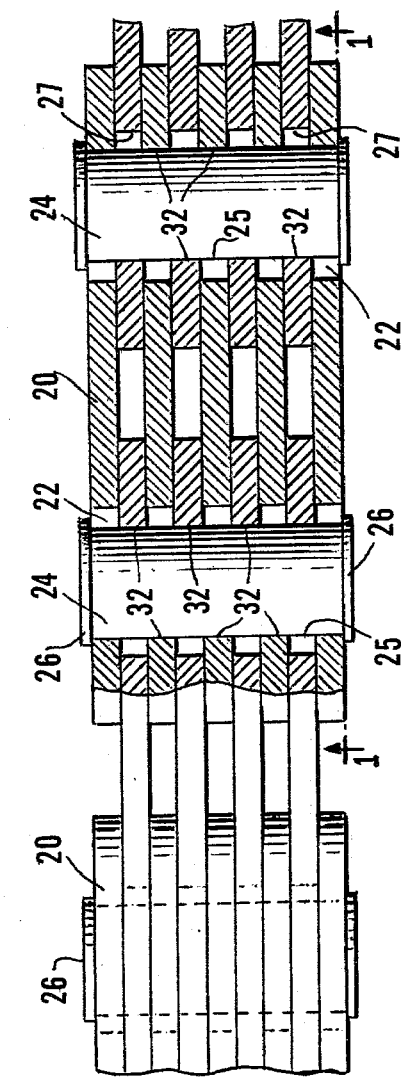

SINGLE ROCKER JOINT DRIVE CHAIN

BACKGROUND OF THE INVENTION

The general principle of the chain of this invention is disclosed in U.S. Pat. Nos. 4,005,609 and 4,078,442 on variable speed drives, issued to the present inventor. This specification discloses and claims its application to articulating link drive chains of the type defined in the American National Standards Institute publication B29.2-1957 (R1971) as "Inverted Tooth (Silent) Chains." The Links of these chains, essentially are operatively distinct from roller type chains only in having projecting teeth instead of rollers for engaging the teeth of drive sprockets.

Early forms of these chains used link pivotal means comprising round holes in the overlapping link ends interconnected by close clearance round pins, the bearing action of the links on the pins simulating that of a simple journal. The effective transverse bearing width of the joints of these chains was thus limited to half the overall chain width. The limited power transmission capacity and durability of this method of chain construction was later improved upon by adding pairs of segmental bushings, bridging the gap between transversely aligned, overlapping link ends, thus extending the link bearing on the pins continuously across the full width of the chain and constituting a three-part joint. This doubled the effective bearing area of the links on the pins while still retaining the characteristic journal bearing action. Effective lubrication of the concentric bearing surfaces of the joints of such chains under load was difficult. Development thus moved toward friction reducing joint constructions utilizing pairs of pins having opposed, convex surfaces in rocking contact with each other. Latterly, the design of these chains has tended towards use of such two-part rocker joint configurations and link apertures of more complex form and increased manufacturing cost. The current development trend thus may be considered to be away from design simplfication and manufacturing economy.

SUMMARY OF THE INVENTION

The chain of the present invention uses link members with substantially round apertures at each end of the link interconnected by round pins extending through transversely registering apertures of overlapping link ends. The diameter of the link apertures is larger than the diameter of the pins to provide clearance for the relatively frictionless direct rocking bearing action of the links on the pins when pivoting into engagement with drive sprockets. The resulting bearing contact between the pins and links is internally tangential and self-centering as distinct from the externally tangential opposed convex non-centering two-part bearings of the prior art typified, for example, by U.S. Pat. Nos. 3,742,776 and 4,010,656.

While direct bearing of the link apertures on the single joint pin of the present invention appears to again limit the effective link bearing in a given chain to the sum of the individual link thicknesses, this is offset by the considerably higher capacity of the internally tangential bearing of the pins in the round apertures. This will be understood by those skilled in the art as deriving from the well known Hertz equations for contact stress between bearing elements equivalent to those of the chain joint members of the chain of the present invention. As those equations generally indicate, given comparable bearing dimensions and with equal manufacturing and material quality, the internally tangential pin-link bearing of the chain of the present invention, definable in Hertz terms as a "cylinder in groove" stress condition, as compared with the opposed convex "cylinder on cylinder" condition of the cited prior art, provides substantially higher specific chain power transmission capacity than obtained with the latter form.

The round pins are free to rotate independently of the links. Bearing stress and wear thus are distributed around the pin circumference. The ends of the pins are provided with either an integral shoulder or are of constant diameter with end portions grooved for application of retaining rings and for transverse retention of the link assembly. The link aperture diameter, being substantially larger than the integral pin shoulder diameters enables chain assembly without tools by passing the pins through apertures of overlapping link members when contracted lenthwise into transverse registration. Again moving thus aligned link members lengthwise with an opposite pull takes up the aperture clearances and the pin shoulders or retaining ring portions then substantially overlap an edge of a link aperture at each transversely opposite outer link of the assembly for retention thereof. The pins then are seated in self-centering diametrically opposed rocking bearing contact between alternating aperture edges of transversely adjacent overlapping link ends.

While the link articulating angle of this chain preferably is limited to that required for operation on drive sprockets with not less than 25 teeth, operation on as few as 17 sprocket tooth numbers entailing a nominal degree of sliding action on the pins is not detrimental. Efficient chain operation on the smaller sprockets generally specifies lower loads in recognition of the increased impact of the links on such smaller sprockets, characteristic of all pivoted link chains.

It will be seen that the chain of this invention essentially comprises a simplified two-part drive chain construction with integral retention and assembly means facilitating installation without tools and operation on drive sprockets of conventional silent chain type. The round pins and round link apertures also facilitate lowercost production and utilization of lower cost construction material. The broad objects and advantages of the invention conveyed by the foregoing text are further set forth in the following description, drawing figures and claims of this specification.

THE DRAWINGS

FIG. 1 is an elevational side view of an assembled chain, partly sectioned on the line 1—1 of FIG. 2.

FIG. 2 is a plan view of the assembly of FIG. 1, partly sectioned on the line 2—2 of FIG. 1.

FIG. 3 is a fragmentary view in elevation of an alternative method of retaining the assembly.

FIG. 4 is a partly sectioned view on the line 4—4 of FIG. 3.

DETAILED DESCRIPTION

Referring to the drawings, FIGS. 1 to 4 illustrate preferred embodiments of the chain of this invention as comprising link members 20 of typical inverted tooth form having round apertures 22 at each link end portion. In assembly the links are arranged end to end with overlapping end portions and transversely registering apertures and are interconnected by round rocker pin members 24 extending through the apertures. The apertures are made sufficiently larger in diameter than the diameter of the pins to provide a clearance 27 for the rocker bearing action of the links at the aperture edge bearing contact 32 with the pins. The latter are in self-centering rocking bearing contact with diametrically opposed aperture edge portions of adjacent link members and are free to rotate independently of the link pivotal action and can do so over the slack portion of a chain driving between sprockets.

As shown in the drawings, each pin in the assembled chain is self-centering between opposite aperture edge bearing points 32 of adjacent transversely aligned links. Thus assembled, the center to center spacing of the pin members defines the pitch dimension of the chain while the bearing contact 32 of the pins with the link aperture edges defines link articulation centers. Projecting end portions of the pins have integral machined or upset shoulders 26 for lateral retention of the links on the pins. Alternatively, as shown in FIGS. 3 and 4, the pins may be of substantially constant diameter and provided with grooves 28 for application of retaining rings 30 of standard E-ring or other desired form.

The forms of this invention herewith shown and described are to be taken as preferred examples thereof, and it is to be understood that obvious changes apparent to those skilled in the art which may be made in the shape, size and arrangement of the parts come within the scope of the appended claims.

What is claimed is:

1. A rocker joint drive chain comprising a plurality of apertured link members assembled end to end with overlapping end portions and registering apertures interconnected by pivot pins extending through the apertures and constituting pitch centers for a pivotal rocking action of the links on the pins, said apertures being substantially larger than the pins to provide clearance for the rocking action and for removal of the pins, said pins having end portions larger than the pin portions between their end portions and constituting chain transverse assembly retention means, said end portions also being smaller than the link apertures to facilitate insertion and removal therethrough, said pins being free to rotate independently of the link rocking action, the pin centers thereof constituting the center to center pitch dimension of an assembled chain.

2. The drive chain of claim 1 wherein said working clearance comprises means for longitudinal contraction of an assembled chain length for removal or insertion of the pins.

3. The drive chain of claim 2 wherein longitudinal tension applied to the chain assembly moves the link aperture edge portions into abutting alignment with pin end portions for transverse retention of the links on the pins.

4. The drive chain of claim 1 wherein the pivot pins are in partial rocking bearing contact and partial sliding bearing contact with link apertures.

5. The drive chain of claim 1 wherein a center to center spacing of the pin members defines the pitch dimension of the assembled chain and the bearing contact of the pin with a link aperture defines an articulation center of a link.

6. The drive chain of claim 1 wherein the pivotal bearing contact of the link aperture surface with the pin surface is internally tangential.

* * * * *